United States Patent
Hatae et al.

(10) Patent No.: US 10,968,863 B2
(45) Date of Patent: Apr. 6, 2021

(54) INTERNAL COMBUSTION ENGINE

(71) Applicant: HONDA MOTOR CO., LTD., Tokyo (JP)

(72) Inventors: Ryo Hatae, Wako (JP); Masakazu Hoshino, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/797,235

(22) Filed: Feb. 21, 2020

(65) Prior Publication Data
US 2020/0309061 A1    Oct. 1, 2020

(30) Foreign Application Priority Data
Mar. 27, 2019 (JP) .............................. JP2019-061548

(51) Int. Cl.
*F01M 1/02* (2006.01)
*F16H 21/12* (2006.01)
*F16H 7/04* (2006.01)
*F02F 7/00* (2006.01)
*F01P 5/12* (2006.01)
*F16F 15/26* (2006.01)
(Continued)

(52) U.S. Cl.
CPC .............. *F02F 7/0053* (2013.01); *F01P 5/12* (2013.01); *F02N 15/022* (2013.01); *F16C 3/06* (2013.01); *F16F 15/264* (2013.01)

(58) Field of Classification Search
CPC ... F01M 1/02; F16H 2057/0203; F16H 21/12; F16H 35/18; F16H 57/021; F16H 57/04; F16H 3/089
See application file for complete search history.

(56) References Cited

U.S. PATENT DOCUMENTS 5,085,053 A * 2/1992 Hayashi ................. B62M 19/00
                                                              60/487
6,823,829 B1 * 11/2004 Kawamoto .............. F01M 1/02
                                                              123/196 R
(Continued)

FOREIGN PATENT DOCUMENTS

DE    199 56 732 A1    6/2000
DE    100 06 690        6/2001
(Continued)

OTHER PUBLICATIONS

German Office Action dated Nov. 6, 2020, 9 pages.
Japanese Office Action dated Feb. 16, 2021, English abstract included, 9 pages.

*Primary Examiner* — Long T Tran
(74) *Attorney, Agent, or Firm* — Rankin, Hill & Clark LLP

(57) ABSTRACT

An internal combustion engine includes: a crankshaft supported via a bearing; a balancer drive gear; a balancer shaft; and a one-way clutch mechanism that transmits to the crankshaft a drive force to start the internal combustion engine. In the internal combustion engine, the bearing includes an oil seal built therein, the oil seal sealing a crank chamber of the crankcase. The one-way clutch mechanism includes a case fixed to the crankshaft and a starter driven gear provided relatively rotatably with respect to the case and driven by the drive force. The starter driven gear includes a thrust bearing portion that abuts on the balancer drive gear in an axial direction of the crankshaft.

8 Claims, 6 Drawing Sheets

(51) Int. Cl.
*F16C 3/06* (2006.01)
*F02N 15/02* (2006.01)

(56) References Cited

U.S. PATENT DOCUMENTS

| | | | | |
|---|---|---|---|---|
| 2004/0255890 | A1* | 12/2004 | Tsutsumi | F02N 15/022 |
| | | | | 123/179.24 |
| 2008/0073153 | A1* | 3/2008 | Fujimoto | F01M 1/02 |
| | | | | 184/6.28 |
| 2008/0161153 | A1* | 7/2008 | Nakajima | F16H 57/04 |
| | | | | 477/39 |
| 2018/0087437 | A1* | 3/2018 | Okada | F01P 7/14 |

FOREIGN PATENT DOCUMENTS

| | | |
|---|---|---|
| DE | 600 14 252 T2 | 2/2005 |
| JP | H01-166816 | 11/1989 |
| JP | 2004-060453 | 2/2004 |
| JP | 2005-009464 | 1/2005 |
| JP | 2009-209969 | 9/2009 |
| JP | 2014-047720 | 3/2014 |

* cited by examiner

US 10,968,863 B2

INTERNAL COMBUSTION ENGINE

INCORPORATION BY REFERENCE

The present application claims priority under 35 U.S.C. § 119 to Japanese Patent Application No. 2019-061548 filed on Mar. 27, 2019. The content of the application is incorporated herein by reference in its entirety.

TECHNICAL FIELD

The present invention relates to an internal combustion engine.

BACKGROUND ART

A hitherto known internal combustion engine includes a crankshaft supported via a bearing by a crankcase, a balancer drive gear disposed on the crankshaft, a balancer shaft on which a balancer is disposed, a balancer driven gear that is disposed on the balancer shaft and that meshes with the balancer drive gear, and a one-way clutch mechanism that transmits a drive force to start the internal combustion engine to the crankshaft. In the internal combustion engine, the balancer drive gear is disposed on the crankshaft between the bearing and the one-way clutch mechanism (see, for example, Patent Document 1). In the technique disclosed in Patent Document 1, an oil seal that seals a crank chamber is disposed between the bearing and the balancer drive gear.

PRIOR ART DOCUMENT

Patent Document

[Patent Document 1]
Japanese Patent Application Laid-open No. 2009-209969

SUMMARY OF THE INVENTION

Problems to be Solved by the Invention

A need exists in internal combustion engines for an internal combustion engine built small in size in an axial direction of the crankshaft. Because of the oil seal disposed between the bearing and the balancer drive gear in the known internal combustion engine described above, however, the internal combustion engine tends to become large in size in the axial direction of the crankshaft. Although a thrust force acting in the axial direction of the crankshaft can at times act on the one-way clutch mechanism, increasing the size of the one-way clutch mechanism in order to withstand the thrust force unfortunately increases the size of the internal combustion engine in the axial direction of the crankshaft.

The present invention has been made in view of the foregoing situation and it is an object of the present invention to build an internal combustion engine that is smaller in size in an axial direction of a crankshaft and to enable a thrust force acting on a one-way clutch mechanism to be effectively borne.

Means for Solving the Problems

To achieve the foregoing object, an aspect of the present invention provides an internal combustion engine including: a crankshaft (11) supported by a crankcase (12) via a bearing (35); a balancer drive gear (36) disposed on the crankshaft (11); a balancer shaft (30) on which a balancer is disposed; a balancer driven gear (43) disposed on the balancer shaft (30), the balancer driven gear (43) meshing with the balancer drive gear (36); and a one-way clutch mechanism (37) that transmits to the crankshaft (11) a drive force to start the internal combustion engine, the balancer drive gear (36) being disposed between the bearing (35) and the one-way clutch mechanism (37) on the crankshaft (11). In the internal combustion engine, the bearing (35) includes an oil seal (35d) built therein, the oil seal (35d) sealing a crank chamber (33) of the crankcase (12), the one-way clutch mechanism (37) includes a case (55) fixed to the crankshaft (11) and a starter driven gear (56) provided relatively rotatably with respect to the case (55) and driven by the drive force, and the starter driven gear (56) includes a thrust bearing portion (55e) that abuts on the balancer drive gear (36) in an axial direction of the crankshaft (11).

In the foregoing configuration, preferably, the thrust bearing portion (55e) may be a protrusion that protrudes in the axial direction of the crankshaft (11) from a side surface of the starter driven gear (56).

In the foregoing configuration, preferably, the internal combustion engine further includes an output gear (38) disposed on an outside in the axial direction of the crankshaft (11) relative to the one-way clutch mechanism (37), the output gear (38) outputting rotation of the crankshaft (11) to another rotational shaft (31). In the internal combustion engine, preferably, the starter driven gear (56) may extend in a radial direction along the balancer drive gear (36) at a position offset on a side of the balancer drive gear (36) between the balancer drive gear (36) and the output gear (38).

In the foregoing configuration, preferably, the bearing (35), the balancer drive gear (36), the starter driven gear (56), the case (55), and the output gear (38) may be disposed in sequence from a side of the crank chamber (33).

Additionally, in the foregoing configuration, preferably, the balancer drive gear (36) may be clamped between the bearing (35) and the case (55) in the axial direction of the crankshaft (11).

In the foregoing configuration, preferably, the internal combustion engine further includes a water pump (46) connected, rotated integrally with, and disposed coaxially with, the balancer shaft (30), and the water pump (46) may be disposed, in the axial direction of the crankshaft (11), at a position outside the starter driven gear (56) and overlapping the case (55).

Additionally, in the foregoing configuration, preferably, the water pump (46) may include a shaft portion (46a) that is rotatably supported in the crankcase (12) and connected with the balancer shaft (30) and a pump main body portion (46b) that extends from the shaft portion (46a) outwards in the radial direction, and the shaft portion (46a) of the water pump (46) may overlap the case (55).

In the foregoing configuration, preferably, the crankcase (12) may include a support cylinder portion (47a) that supports the shaft portion (46a), and the support cylinder portion (47a) may have a part (47a1) disposed at a position outside the starter driven gear (56) and overlapping the case (55) in the axial direction of the crankshaft (11) and located inside an outer peripheral portion (56c) of the starter driven gear (56) in the radial direction of the starter driven gear (56).

Effects of the Invention

The internal combustion engine includes the crankshaft supported by the crankcase via the bearing, the balancer drive gear disposed on the crankshaft, the balancer shaft on which the balancer is disposed, the balancer driven gear that is disposed on the balancer shaft and that meshes with the balancer drive gear, and the one-way clutch mechanism that transmits to the crankshaft the drive force to start the internal combustion engine. In the internal combustion engine, the balancer drive gear is disposed between the bearing and the one-way clutch mechanism on the crankshaft. The bearing includes the oil seal built therein. The oil seal seals the crank chamber of the crankcase. The one-way clutch mechanism includes the case fixed to the crankshaft and the starter driven gear provided relatively rotatably with respect to the case and driven by the drive force. The starter driven gear includes the thrust bearing portion that abuts on the balancer drive gear in the axial direction of the crankshaft.

Through the foregoing configuration, because the bearing includes the built-in oil seal that seals the crank chamber of the crankcase, a need can be eliminated for acquiring a space dedicated to the oil seal outside the bearing. Additionally, because the thrust force of the starter driven gear of the one-way clutch mechanism is borne by the balancer drive gear via the thrust bearing portion, the thrust force can be effectively borne without the need to increase the size of the one-way clutch mechanism or to provide a member dedicated to the bearing of the thrust force. Thus, the internal combustion engine can be built smaller in size in the axial direction of the crankshaft and the thrust force acting on the one-way clutch mechanism can be effectively borne.

In the foregoing configuration, the thrust bearing portion may be a protrusion that protrudes in the axial direction of the crankshaft from the side surface of the starter driven gear.

Through the foregoing configuration, the thrust bearing portion, because of the protruding shape thereof, can be accurately brought into abutment on the balancer drive gear.

Additionally, in the foregoing configuration, the output gear that outputs the rotation of the crankshaft to the other rotational shaft may be disposed on the outside in the axial direction of the crankshaft relative to the one-way clutch mechanism and the starter driven gear may extend in the radial direction along the balancer drive gear at a position offset on the side of the balancer drive gear between the balancer drive gear and the output gear.

Through the foregoing configuration, because the starter driven gear extends along the balancer drive gear at a position offset on the side of the balancer drive gear, the thrust bearing portion can readily be brought into abutment on the balancer drive gear and the thrust force can be effectively borne. Additionally, the starter driven gear is disposed at the position offset on the side of the balancer drive gear and closer to the side of the crank chamber. Thus, the internal combustion engine can be built smaller in size in the axial direction of the crankshaft.

Additionally, in the foregoing configuration, the bearing, the balancer drive gear, the starter driven gear, the case, and the output gear may be disposed in sequence from the crank chamber side.

This configuration can achieve a compact arrangement, by which the thrust force of the starter driven gear is borne by the balancer drive gear and the rotation is output from the output gear.

Additionally, in the foregoing configuration, the balancer drive gear may be clamped between the bearing and the case in the axial direction of the crankshaft.

Through the foregoing configuration, the balancer drive gear can be correctly positioned in the axial direction of the crankshaft by a simple structure through the use of the case and the thrust force of the starter driven gear can be borne through the use of the balancer drive gear that is correctly positioned by the case.

Additionally, in the foregoing configuration, the water pump connected and rotated integrally with the balancer shaft may be disposed coaxially with the balancer shaft and may be disposed, in the axial direction of the crankshaft, at a position outside the starter driven gear and overlapping the case.

Through the foregoing configuration, the water pump can be disposed closer to the side of the starter driven gear in the axial direction of the crankshaft, so that the internal combustion engine can be built smaller in size in the axial direction of the crankshaft.

Additionally, in the foregoing configuration, the water pump may include the shaft portion rotatably supported in the crankcase and connected with the balancer shaft and the pump main body portion that extends from the shaft portion outwards in the radial direction, and the shaft portion of the water pump may overlap the case.

Through the foregoing configuration, the shaft portion of the water pump can be disposed closer to the side of the starter driven gear in the axial direction of the crankshaft, so that the internal combustion engine can be built smaller in size in the axial direction of the crankshaft.

Additionally, in the foregoing configuration, the crankcase may include the support cylinder portion that supports the shaft portion. The support cylinder portion may have a part disposed at a position outside the starter driven gear and overlapping the case in the axial direction of the crankshaft and located inside the outer peripheral portion of the starter driven gear in the radial direction of the starter driven gear.

Through the foregoing configuration, the support cylinder portion of the crankcase can be disposed closer to the side of the starter driven gear, so that the internal combustion engine can be built smaller in size.

MODE FOR CARRYING OUT THE INVENTION

Figure 1:
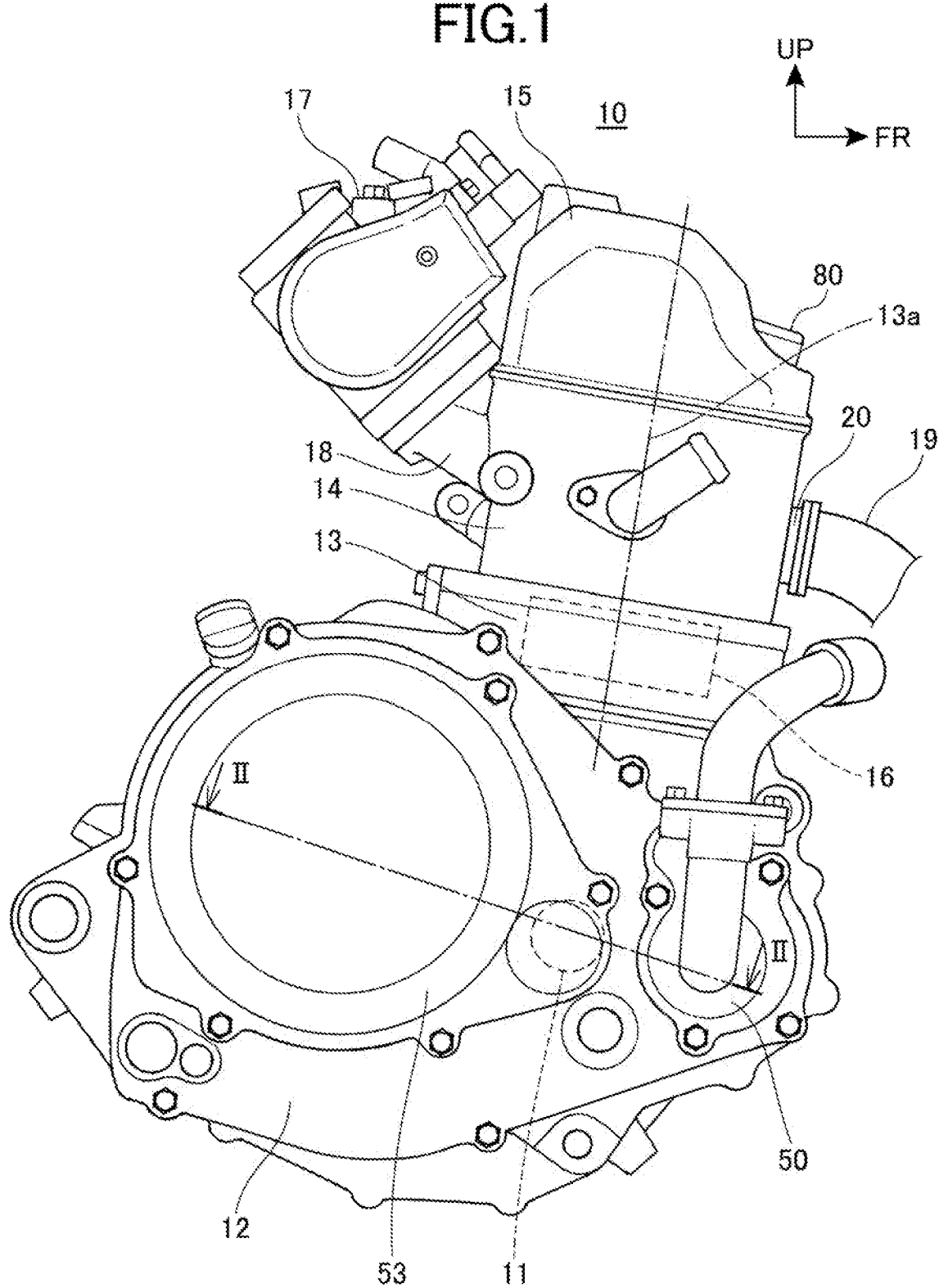
FIG. 1 is a right side elevational view of an internal combustion engine according to an embodiment of the present invention.

An embodiment of the present invention will be described below with reference to the accompanying drawings. Throughout the descriptions given hereunder, expressions indicating directions including front and rear, right and left, and upper and lower are identical to directions relative to a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a right side elevational view of an internal combustion engine according to an embodiment of the present invention.

This internal combustion engine 10 is mounted on a motorcycle. The motorcycle includes a vehicle body frame (not illustrated), a front fork (not illustrated) supported at a front end portion of the vehicle body frame, a swing arm (not illustrated) oscillatably supported at a rear portion of the vehicle body frame, a front wheel (not illustrated) supported by the front fork, and a rear wheel supported by the swing arm, and the internal combustion engine 10, which is supported on the vehicle body frame.

The motorcycle is a saddle riding vehicle in which an occupant straddles an occupant's seat (not illustrated) supported on the vehicle body frame.

The internal combustion engine 10 includes a crankcase 12, a cylinder 13, a cylinder head 14, and a cylinder head cover 15. The crankcase 12 supports a crankshaft 11, which extends in a vehicle width direction (left-right direction). The cylinder 13 extends superiorly from an upper surface of a front portion of the crankcase 12. The cylinder head 14 is connected with an upper surface of the cylinder 13. The cylinder head cover 15 is connected with an upper surface of the cylinder head 14.

The internal combustion engine 10 is an engine in which a cylinder axis 13a of the cylinder 13 inclines slightly toward the front with respect to a vertical direction.

A piston 16 makes a reciprocating motion inside the cylinder 13 in a direction of the cylinder axis 13a.

A throttle body 17 of an intake system of the internal combustion engine 10 is connected with an intake port 18, which is disposed on a side of a rear surface of the cylinder head 14.

An exhaust pipe 19 is connected with an exhaust port 20, which is disposed on a side of a front surface of the cylinder head 14.

Figure 2:
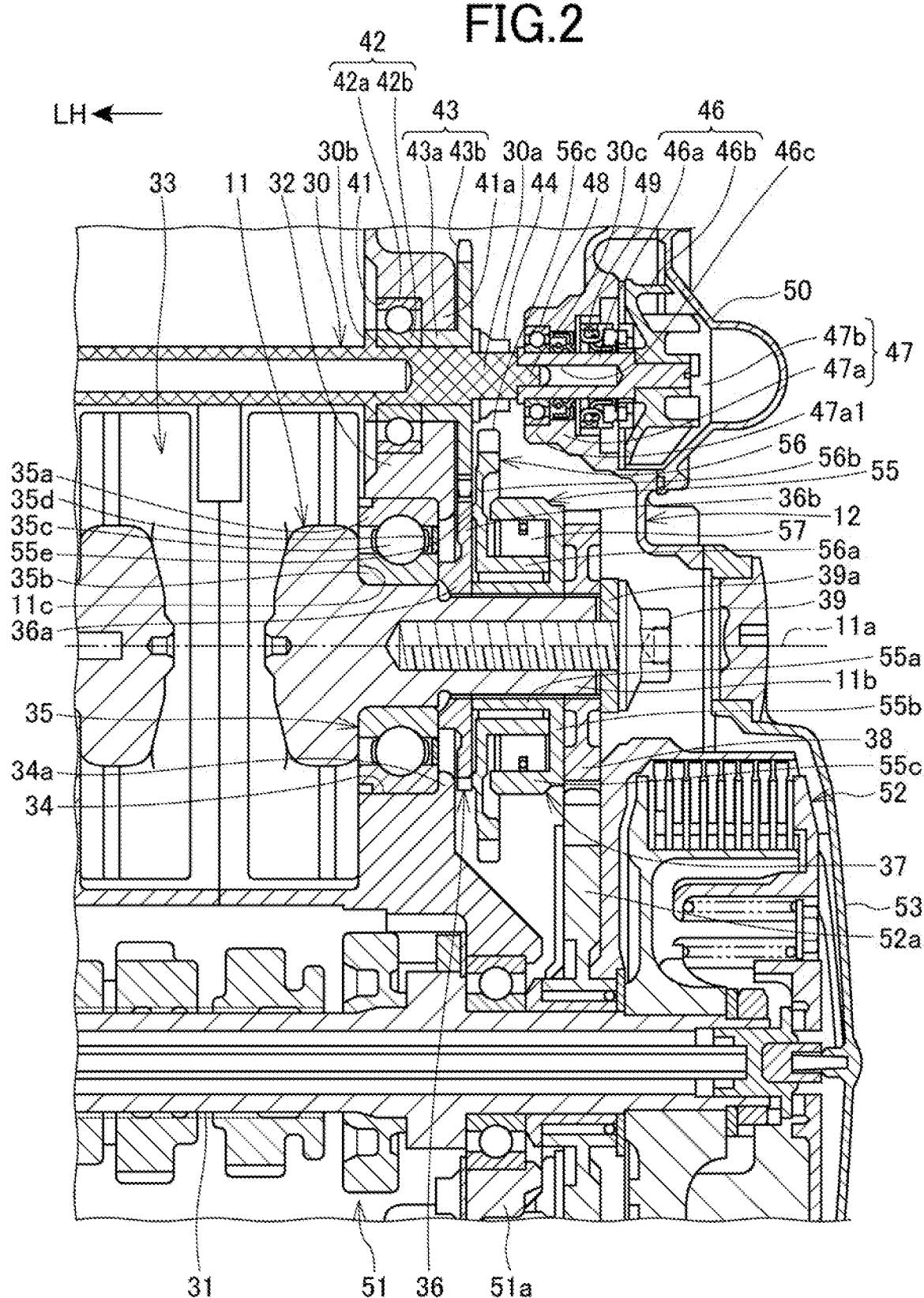
FIG. 2 is a cross-sectional view taken along II-II in FIG. 1.

FIG. 2 is a cross-sectional view taken along II-II in FIG. 1.

Reference is made to FIG. 2. The crankcase 12 houses the crankshaft 11, a balancer shaft 30, a main shaft 31 (another rotational shaft), and a counter shaft (not illustrated). A balancer (not illustrated) is disposed on the balancer shaft 30. The main shaft 31 is driven by the crankshaft 11. The counter shaft is driven by the main shaft 31.

The crankshaft 11 has a crank axis 11a as a rotational center. The crank axis 11a extends horizontally in a vehicle width direction. The crankshaft 11 has an axial direction extending in a direction in which the crank axis 11a extends.

The crankshaft 11, the balancer shaft 30, the main shaft 31, and the counter shaft extend in parallel with each other.

The crankcase 12 includes a pair of left and right support walls 32. The support walls 32 extend orthogonally to the crankshaft 11. FIG. 2 illustrates a first support wall 32 on the right hand side, but does not illustrate a second support wall 32 on the left hand side. The two support walls 32 are spaced apart from each other in the axial direction of the crankshaft 11. The two support walls 32 define a crank chamber 33, in which the crankshaft 11 is housed, in the axial direction of the crankshaft 11.

The crank chamber 33 communicates with the cylinder 13. The crankshaft 11 is connected with the piston 16 (FIG. 1) via a connecting rod (not illustrated) that passes through the crank chamber 33.

The support walls 32 each have a support hole portion 34, which supports the crankshaft 11. The crankshaft 11 passes through the support hole portions 34. The support hole portions 34 support the crankshaft 11 via bearings 35. An annular flange portion 34a is disposed at an outer end portion in the axial direction of the crankshaft 11 in an inner peripheral portion of the support hole portion 34. The flange portion 34a protrudes inwards in a radial direction.

A shaft end portion 11b on a first end side in the axial direction of the crankshaft 11 passes through the support hole portion 34 and protrudes to an outside of the crank chamber 33.

A balancer drive gear 36, a one-way clutch mechanism 37, and an output gear 38 are mounted on the shaft end portion 11b. The balancer drive gear 36 drives the balancer shaft 30. The one-way clutch mechanism 37 transmits to the crankshaft 11 a drive force to start the internal combustion engine 10. The output gear 38 outputs rotation of the crankshaft 11 to a side of the main shaft 31.

A fixing bolt 39, which depresses the output gear 38 in the axial direction, is fastened to an end face of the shaft end portion 11b.

The support walls 32 each have a balancer shaft support hole portion 41. The balancer shaft support hole portion 41 supports the balancer shaft 30. FIG. 2 does not illustrate a balancer shaft support hole portion on the left hand side.

The balancer shaft 30 passes through the balancer shaft support hole portion 41. The balancer shaft support hole portion 41 supports the balancer shaft 30 via a bearing 42. An annular flange portion 41a is provided at an outer end portion in the axial direction in an inner peripheral portion of the balancer shaft support hole portion 41. The flange portion 41a protrudes inwards in a radial direction.

The balancer shaft 30 has a first end portion 30a in the axial direction passing through the support wall 32 and protrudes to the outside of the crank chamber 33.

A balancer driven gear 43 and a nut 44 are disposed on the first end portion 30a. The balancer driven gear 43 meshes with the balancer drive gear 36. The nut 44 fastens the balancer driven gear 43 to the first end portion 30a.

The balancer driven gear 43 includes a tubular portion 43a and a gear portion 43b. The tubular portion 43a is fixed to an outer peripheral portion of the first end portion 30a. The gear portion 43b extends from an axial outer end of the tubular portion 43a to the outside in the radial direction.

The balancer driven gear 43 is rotated integrally with the balancer shaft 30 by the tubular portion 43a being splined to the outer peripheral portion of the first end portion 30a.

The bearing 42 is fitted into the balancer shaft support hole portion 41 from an inner surface side of the support wall 32. The bearing 42 is correctly positioned in the axial direction by an outer race 42a abutting against the flange portion 41a.

The balancer shaft 30 includes a positioning portion 30b. The positioning portion 30b is disposed inside the bearing 42 in the axial direction and protrudes to the outside in the radial direction. The positioning portion 30b abuts against an inner race 42b of the bearing 42 in the axial direction.

The inner race 42b and the tubular portion 43a of the balancer driven gear 43 are disposed between the positioning portion 30b and the nut 44 in the axial direction and are correctly positioned in the axial direction by being clamped by a fastening force of the nut 44. A part of the tubular portion 43a is passed through an inside of the flange portion 41a.

An engagement portion 30c is provided on an end face of the first end portion 30a of the balancer shaft 30. The engagement portion 30c protrudes in the axial direction.

The balancer shaft 30 has a second end portion (not illustrated) passing through the support wall on the left hand side (not illustrated) and protruding to the outside of the crank chamber 33. The second end portion of the balancer shaft 30 is provided with a balancer (not illustrated) that rotates integrally with the balancer shaft 30. This balancer is operatively associated with the crankshaft 11 and rotates in a direction opposite from the direction in which the crankshaft 11 rotates. The balancer thereby reduces vibration generated through the reciprocating motion of the piston 16.

The crankcase 12 is provided with a water pump 46. The water pump 46 circulates coolant for the internal combustion engine 10.

The crankcase 12 includes a pump support portion 47. The pump support portion 47, which is disposed at a position outside the support wall 32 in the axial direction of the crankshaft 11, supports the water pump 46.

The water pump 46 is connected with, and rotates integrally with, the balancer shaft 30. The water pump 46 is disposed coaxially with the balancer shaft 30 at a position outside with respect to the first end portion 30a of the balancer shaft 30 in the axial direction.

The water pump 46 includes a shaft portion 46a and a pump main body portion 46b. The shaft portion 46a is rotatably supported by the pump support portion 47 and connected with the balancer shaft 30. The pump main body portion 46b has a blade shape extending from the shaft portion 46a outwards in a radial direction.

The shaft portion 46a has an engagement hole 46c, in which the engagement portion 30c of the balancer shaft 30 engages. The water pump 46 is connected relatively unrotatably with the balancer shaft 30 via the engagement hole 46c.

The pump support portion 47 includes a support cylinder portion 47a and a housing portion 47b. The support cylinder portion 47a supports the shaft portion 46a via a pump bearing 48. The housing portion 47b houses the pump main body portion 46b. The coolant flows inside the housing portion 47b.

The support cylinder portion 47a is provided with a sealing member 49. The sealing member 49 seals between the pump bearing 48 and the housing portion 47b.

The housing portion 47b is closed by a lid member 50. The lid member 50 is mounted on an outer side surface of the pump support portion 47.

The main shaft 31 and the counter shaft are housed in a transmission chamber 51 inside the crankcase 12. The main shaft 31 is supported by a wall portion 51a. The wall portion 51a defines the transmission chamber 51.

The main shaft 31 has a first end portion passing through the wall portion 51a to thereby extend to the outside of the crankcase 12. A friction type clutch mechanism 52 is disposed on the first end portion.

The clutch mechanism 52 includes a driven gear 52a. The driven gear 52a meshes with the output gear 38 of the crankshaft 11.

Under a condition in which the clutch mechanism 52 is connected, rotation of the crankshaft 11 is transmitted to the main shaft 31 via the output gear 38 and the driven gear 52a.

Under a condition in which the clutch mechanism 52 is disconnected, the rotation of the crankshaft 11 to be transmitted to the driven gear 52a is idle in the clutch mechanism 52 and is not transmitted to the main shaft 31.

The clutch mechanism 52, the shaft end portion 11b of the crankshaft 11, and other parts are covered in a crankcase cover 53. The crankcase cover 53 is mounted on an outer side surface of the crankcase 12.

The main shaft 31 and the counter shaft each include a plurality of speed change gears. One set of gears capable of transmitting power is formed and a shift speed is selectively established between the main shaft 31 and the counter shaft according to a transmission operation. Rotation of the counter shaft is transmitted to the rear wheel via a drive chain (not illustrated) that connects between the counter shaft and the rear wheel.

Figure 3:
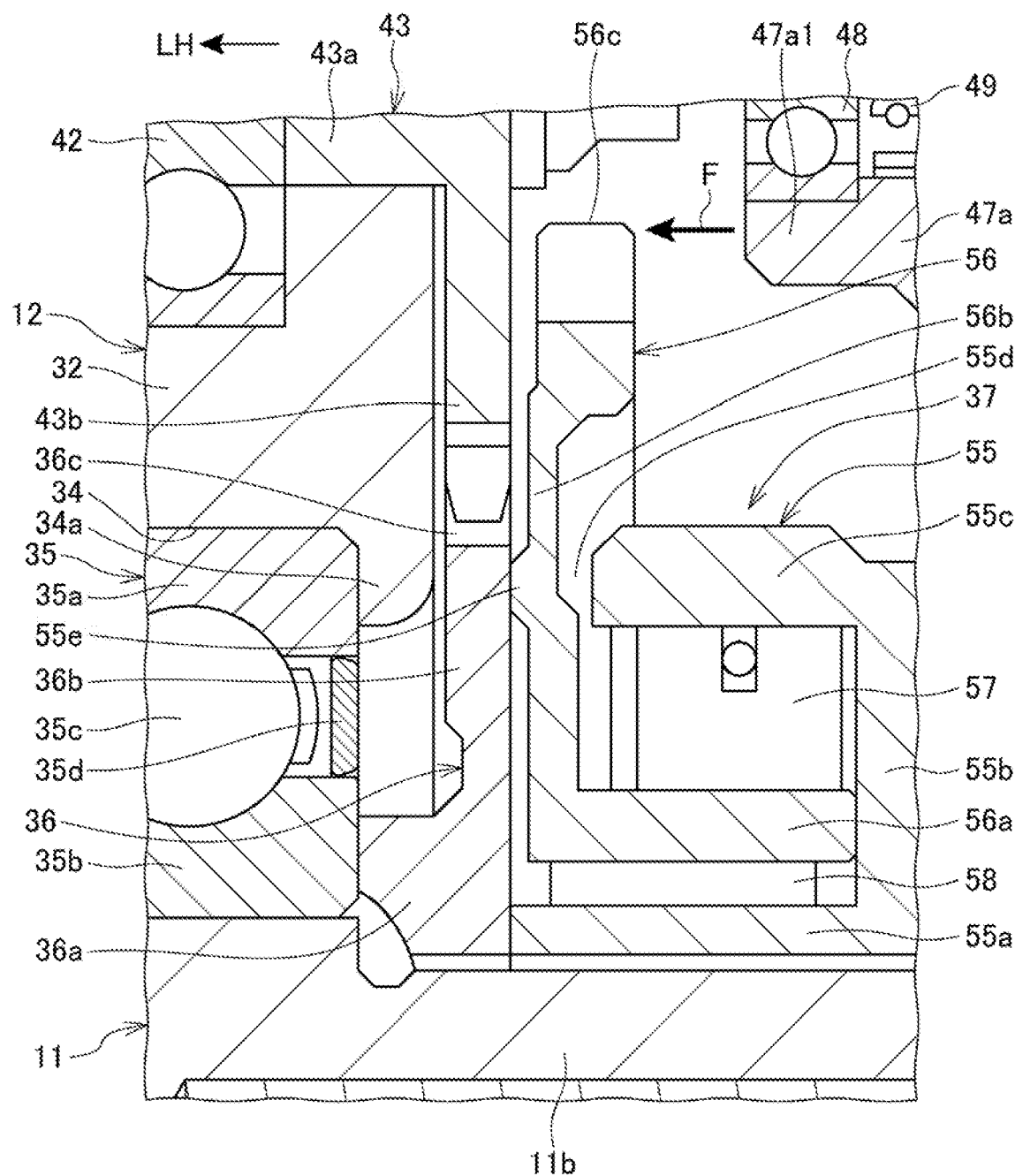
FIG. 3 is an enlarged view of a bearing, a balancer drive gear, a one-way clutch mechanism, and parts therearound illustrated in FIG. 2.

FIG. 3 is an enlarged view of the bearing 35, the balancer drive gear 36, the one-way clutch mechanism 37, and parts therearound illustrated in FIG. 2.

Reference is made to FIGS. 2 and 3. The bearing 35 is a ball bearing including an outer race 35a, an inner race 35b, and a plurality of balls 35c. The outer race 35a fits in an inner peripheral portion of the support hole portion 34 of the crankcase 12. The inner race 35b is disposed inside the outer race 35a. The balls 35c are disposed between the outer race 35a and the inner race 35b.

Additionally, the bearing 35 includes an oil seal 35d built therein. The oil seal 35d closes a space between an inner peripheral surface of the outer race 35a and an outer peripheral surface of the inner race 35b. The oil seal 35d covers the balls 35c from an axial direction of the bearing 35.

The oil seal 35d covers the gap between the outer race 35a and the inner race 35b to thereby seal the crank chamber 33 and enhance airtightness of the crank chamber 33.

The bearing 35 is axially positioned correctly by the outer race 35a being abutted against the flange portion 34a of the support hole portion 34 from the inside of the crank chamber 33.

Additionally, the crankshaft 11 is axially positioned correctly by an end face 11c thereof (FIG. 2), which is disposed inside the crank chamber 33, being abutted against the inner race 35b in the axial direction.

The balancer drive gear 36 is disposed adjacent to the bearing 35 on the outside of the crank chamber 33.

The balancer drive gear 36 includes a ring-shaped fixing portion 36a and a disc-shaped gear main body portion 36b. The fixing portion 36a fits over the shaft end portion 11b of the crankshaft 11. The gear main body portion 36b extends from the fixing portion 36a outwards in a radial direction. A tooth portion 36c is disposed on an outer periphery of the gear main body portion 36b. The tooth portion 36c meshes with the balancer driven gear 43 of the balancer shaft 30.

The balancer drive gear 36 has the fixing portion 36a splined to the shaft end portion 11b and thereby rotates integrally with the crankshaft 11.

The fixing portion 36a is formed to be greater in axial thickness than the gear main body portion 36b and axially protrudes to the side of the inner race 35b relative to the gear main body portion 36b.

The balancer drive gear 36 is correctly positioned in the axial direction of the crankshaft 11 by the fixing portion 36a being clamped between the inner race 35b and the one-way clutch mechanism 37. The fixing portion 36a has a part disposed inside the flange portion 34a in the radial direction.

The gear main body portion 36b extends in the radial direction so as to extend along an outer side surface of the support wall 32.

A drive force to crank and start the internal combustion engine 10 is applied from a starting drive source (not illustrated) included in the internal combustion engine 10 to the one-way clutch mechanism 37 and transmitted to the crankshaft 11 via a clutch member 57. The starting drive source is a starter motor.

When the internal combustion engine 10 is to be started, the one-way clutch mechanism 37 transmits rotation (torque) from the starting drive source to the crankshaft 11. After the internal combustion engine 10 has been started, the one-way clutch mechanism 37 cuts off transmission of the rotation from the crankshaft 11 to the starting drive source.

The one-way clutch mechanism 37 includes a case 55, a starter driven gear 56, and the clutch member 57. The case 55 is fixed to the shaft end portion 11b of the crankshaft 11. The starter driven gear 56 is provided relatively rotatably with respect to the case 55. The clutch member 57 is disposed between the starter driven gear 56 and the case 55.

The case 55 includes a fixing cylinder portion 55a, a disc-shaped side wall portion 55b, and a peripheral wall portion 55c. The fixing cylinder portion 55a fits over the shaft end portion 11b. The side wall portion 55b extends outwards in a radial direction from an end portion on a side opposite from the balancer drive gear 36 in an axial direction of the fixing cylinder portion 55a. The peripheral wall portion 55c extends in the axial direction from an outer edge in the radial direction of the side wall portion 55b toward the side of the balancer drive gear 36.

The case 55 is fixed relatively unrotatably to the crankshaft 11 by the fixing cylinder portion 55a being splined to the shaft end portion 11b.

The case 55 is correctly positioned in the axial direction of the crankshaft 11 by the fixing cylinder portion 55a being clamped between the balancer drive gear 36 and the output gear 38.

The peripheral wall portion 55c covers the fixing cylinder portion 55a from the outside in the radial direction. The peripheral wall portion 55c extends substantially in parallel with the fixing cylinder portion 55a. The peripheral wall portion 55c is shorter in length in the axial direction than the fixing cylinder portion 55a and a gap 55d is formed in the axial direction between an inner end of the peripheral wall portion 55c and an outer side surface of the balancer drive gear 36.

The starter driven gear 56 includes an outer cylinder portion 56a and a gear portion 56b. The outer cylinder portion 56a fits over an outer peripheral portion of the fixing cylinder portion 55a of the case 55. The gear portion 56b extends to form a disc shape outwards in the radial direction from an end portion of the outer cylinder portion 56a on the side adjacent to the balancer drive gear 36 in the axial direction.

The outer cylinder portion 56a is relatively rotatable with respect to the fixing cylinder portion 55a and the starter driven gear 56 is relatively rotatable with respect to the case 55 via the outer cylinder portion 56a.

A roller bearing 58 is disposed between an inner peripheral portion of the outer cylinder portion 56a and an outer peripheral portion of the fixing cylinder portion 55a.

The gear portion 56b passes through the gap 55d to thereby extend farther outwards in the radial direction than the peripheral wall portion 55c of the case 55.

A thrust bearing portion 55e is disposed on a side surface of the gear portion 56b, which faces an outer side surface of the balancer drive gear 36. The thrust bearing portion 55e abuts on the outer side surface of the balancer drive gear 36.

The thrust bearing portion 55e is a protrusion that protrudes in the axial direction of the crankshaft 11 from the side surface of the gear portion 56b toward the balancer drive gear 36.

The thrust bearing portion 55e is disposed inside the tooth portion 36c of the balancer drive gear 36 and the peripheral wall portion 55c of the case 55 in the radial direction.

The clutch member 57 is disposed between an inner peripheral portion of the peripheral wall portion 55c of the case 55 and an outer peripheral portion of the outer cylinder portion 56a of the starter driven gear 56.

The clutch member 57 transmits torque between the starter driven gear 56 and the case 55 in a direction in which the crankshaft 11 is rotated by the drive force of the starting drive source and cuts off the transmission of the torque in a direction in which the crankshaft 11 is rotated in an opposite direction.

Specifically, when the internal combustion engine 10 is cranked, the starter driven gear 56 and the case 55 are connected with each other by the clutch member 57 and are rotated integrally. After the internal combustion engine 10 has been started, the connection by the clutch member 57 is disconnected and the case 55, which rotates integrally with the crankshaft 11, rotates idly with respect to the starter driven gear 56.

The gear portion 56b of the starter driven gear 56 is offset on the side of the balancer drive gear 36 between the balancer drive gear 36 and the output gear 38 in the axial direction of the crankshaft 11. The gear portion 56b extends in the radial direction along the balancer drive gear 36 at a position close to the outer side surface of the balancer drive gear 36 in the axial direction.

The bearing 35, the balancer drive gear 36, the starter driven gear 56, the case 55, and the output gear 38 are disposed in sequence from the crank chamber 33 side, side-by-side in the axial direction on the shaft end portion 11b of the crankshaft 11.

The output gear 38 has an inner peripheral portion splined to the shaft end portion 11b to thereby rotate integrally with the crankshaft 11.

The output gear 38 is positioned correctly in the axial direction by being depressed in the axial direction of the crankshaft 11 by the fixing bolt 39 via a washer 39a and clamped between the washer 39a and the case 55.

Specifically, the balancer drive gear 36, the one-way clutch mechanism 37, and the output gear 38 are correctly positioned in the axial direction by being clamped between the inner race 35b of the bearing 35 and the fixing bolt 39.

Because the bearing 35 includes the oil seal 35d built therein, the internal combustion engine 10 allows the crankshaft 11 to be built shorter in the axial direction while achieving sealing performance of the crank chamber 33, compared with a configuration in which the oil seal is disposed in juxtaposition with the bearing 35. The foregoing configuration enables the balancer drive gear 36 to be disposed closer to the bearing 35 side in the crank chamber 33, so that the internal combustion engine 10 can be built smaller in size in the axial direction of the crankshaft 11.

Additionally, because the balancer drive gear 36 is disposed closer to the bearing 35 side, the balancer driven gear 43, which meshes with the balancer drive gear 36, can also be disposed closer to the bearing 35 side in the axial direction. Thus, the internal combustion engine 10 can be built smaller in size in the axial direction of the crankshaft 11.

Moreover, because the balancer driven gear 43, which is disposed on the balancer shaft 30, is disposed closer to the bearing 35 side in the axial direction, the water pump 46, which is disposed coaxially with the balancer shaft 30, can also be disposed closer to the bearing 35 side in the axial direction. Thus, the internal combustion engine 10 can be built smaller in size in the axial direction of the crankshaft 11.

A thrust force F in the axial direction of the crankshaft 11 acting on the starter driven gear 56 is borne by the thrust bearing portion 55e of the gear portion 56b abutting on the outer side surface of the balancer drive gear 36. The thrust force F acting on the starter driven gear 56 during cranking of the internal combustion engine 10 can thus be effectively borne by the balancer drive gear 36. Thus, the starter driven gear 56 can bear the thrust force F without the need to increase a wall thickness of the starter driven gear 56 or provide a separate bearing member. The internal combustion engine 10 can thus be built smaller in size in the axial direction of the crankshaft 11.

The shaft portion 46a of the water pump 46 and the support cylinder portion 47a of the pump support portion 47 of the crankcase 12 are disposed, in the axial direction of the crankshaft 11, to be brought closer to the bearing 35 side up to a position at which the shaft portion 46a and the support cylinder portion 47a overlap the case 55 outside the starter driven gear 56. Thus, the internal combustion engine 10 can be built smaller in size in the axial direction of the crankshaft 11.

Additionally, the support cylinder portion 47a has a part 47a1 located inside an outer peripheral portion 56c of the starter driven gear 56 in the radial direction of the starter driven gear 56. The support cylinder portion 47a can thus be disposed closer to the crankshaft 11 side in the radial direction, so that the crankcase 12 can be built smaller in size.

Figure 4:
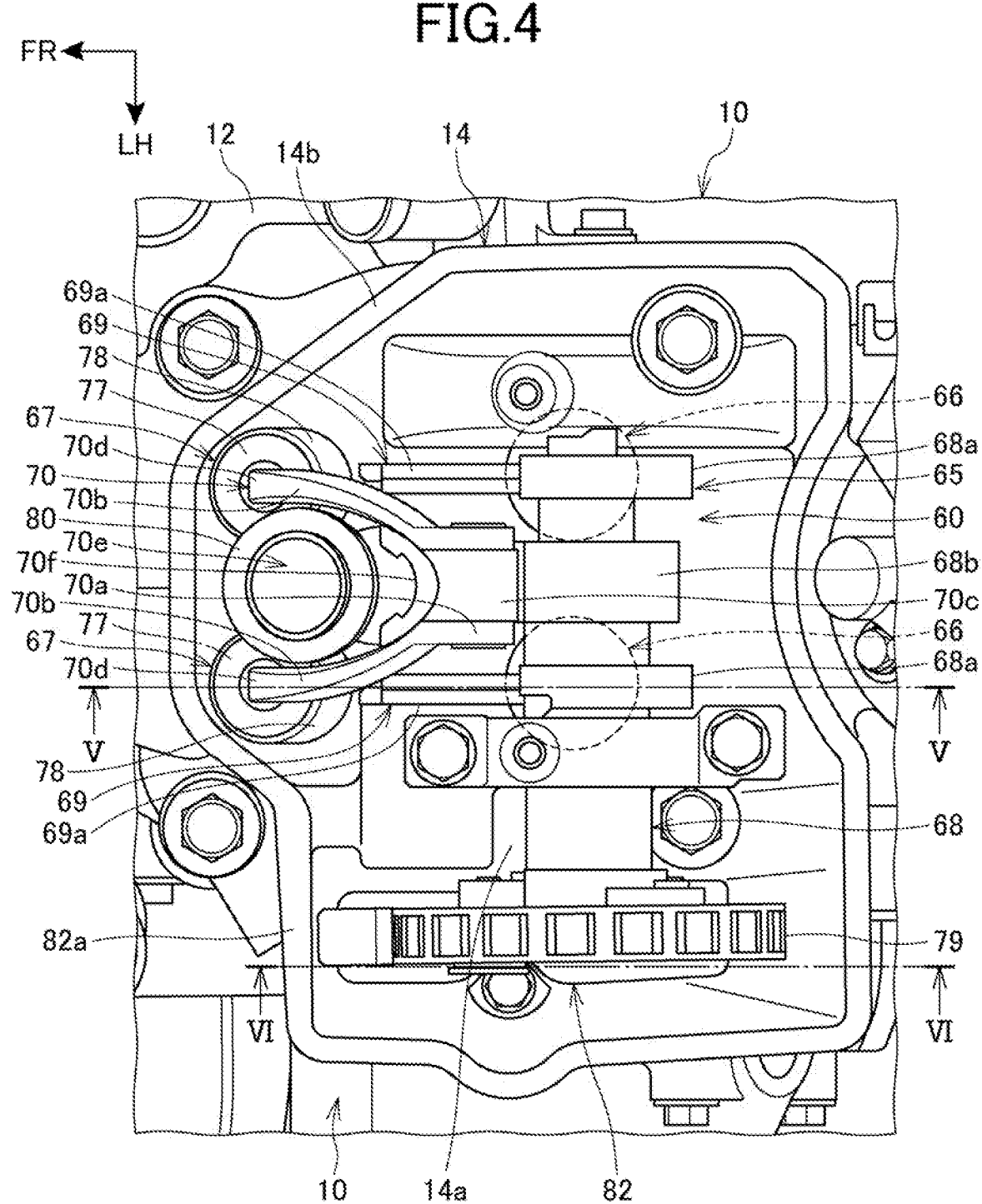
FIG. 4 is an illustration of a cylinder head with a cylinder head cover removed, as viewed from above.
Figure 5:
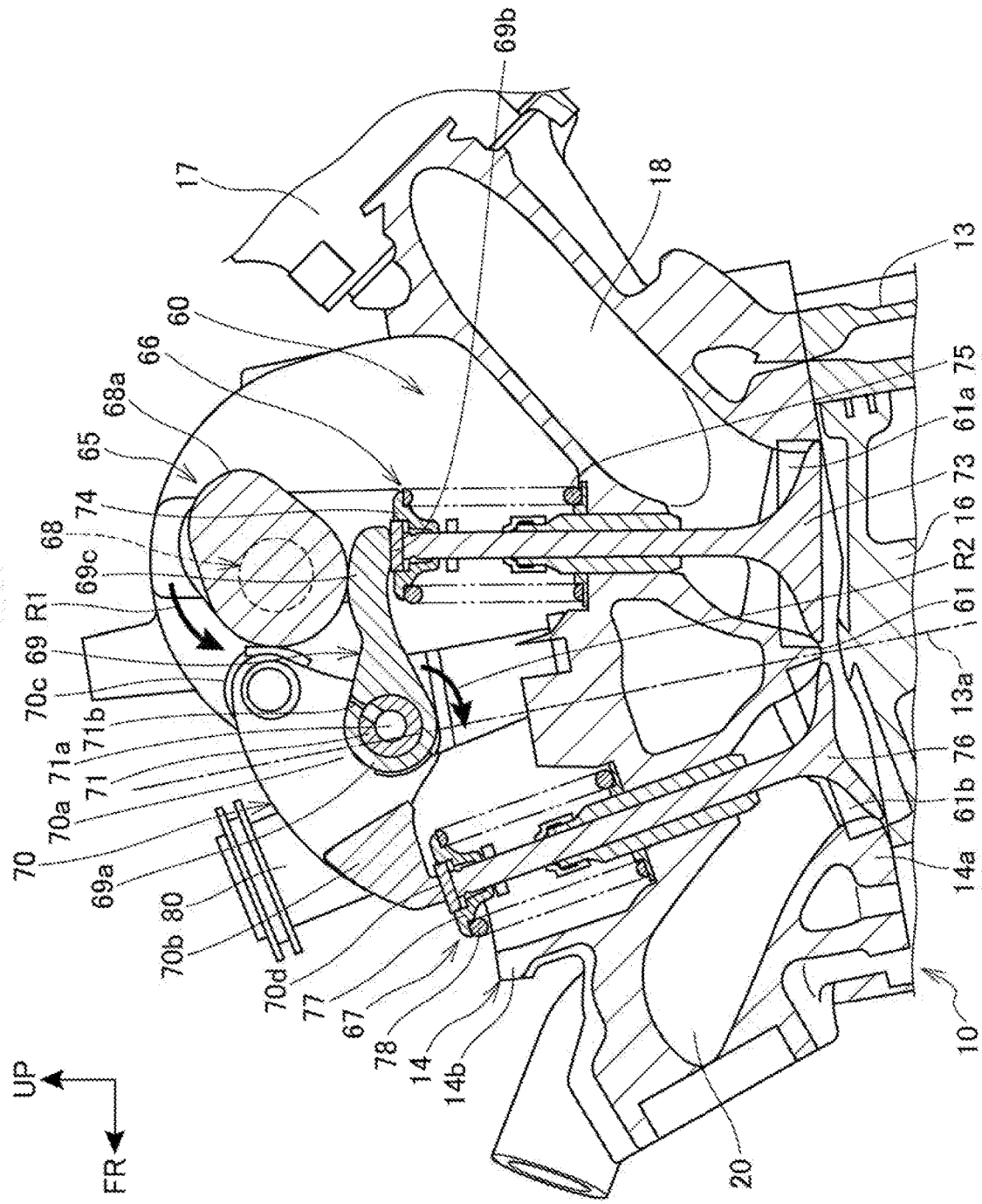
FIG. 5 is a cross-sectional view taken along V-V in FIG. 4.

FIG. 4 is an illustration of the cylinder head 14 with the cylinder head cover 15 removed, as viewed from above. FIG. 5 is a cross-sectional view taken along V-V in FIG. 4.

Reference is made to FIGS. 4 and 5. The cylinder head 14 includes a base portion 14a and a peripheral wall portion 14b. The base portion 14a is connected with an end face of the cylinder 13 so as to face the piston 16. The peripheral wall portion 14b stands from the base portion 14a in a direction in which the cylinder axis 13a extends. A space enclosed by the peripheral wall portion 14b and the base portion 14a is a valve-actuating chamber 60.

The cylinder head cover 15 (FIG. 1) is mated to an end face of the peripheral wall portion 14b to thereby close the valve-actuating chamber 60 from above.

The base portion 14a of the cylinder head 14 has a recessed combustion recess 61, which faces a top face of the piston 16. A combustion chamber is defined by the combustion recess 61 and the top face of the piston 16.

The base portion 14a is provided with the intake port 18 and the exhaust port 20.

The combustion recess 61 has a pair of intake opening portions 61a and a pair of exhaust opening portions 61b. The intake opening portions 61a bring the intake port 18 into communication with the combustion chamber. The exhaust opening portions 61b bring the exhaust port 20 into communication with the combustion chamber.

A valve-actuating mechanism 65 is disposed in the valve-actuating chamber 60.

The valve-actuating mechanism 65 includes a pair of intake valve units 66, a pair of exhaust valve units 67, a camshaft 68, a pair of intake rocker arms 69, an exhaust rocker arm 70, and a rocker arm support shaft 71. The camshaft 68 is rotated by the drive force of the crankshaft 11. The intake rocker arms 69 are driven by the camshaft 68 to thereby depress the intake valve units 66. The exhaust rocker arm 70 is driven by the camshaft 68 to thereby depress the exhaust valve units 67. The rocker arm support shaft 71 rotatably supports the intake rocker arms 69 and the exhaust rocker arm 70.

The intake valve units 66 each include an intake valve 73, a disc-shaped retainer 74, and a valve spring 75. The intake valve 73 opens or closes the intake opening portion 61a. The retainer 74 is disposed at an end portion of a valve stem of the intake valve 73. The valve spring 75 urges the intake valve 73 such that the intake valve 73 closes the intake opening portion 61a.

The valve spring 75 is disposed in a compressed state between the base portion 14a and the retainer 74.

The exhaust valve units 67 each include an exhaust valve 76, a disc-shaped retainer 77, and a valve spring 78. The exhaust valve 76 opens or closes the exhaust opening portion 61b. The retainer 77 is disposed at an end portion of a valve stem of the exhaust valve 76. The valve spring 78 urges the exhaust valve 76 such that the exhaust valve 76 closes the exhaust opening portion 61b.

The valve spring 78 is disposed in a compressed state between the base portion 14a and the retainer 77.

When viewed in an axial direction of the camshaft 68 as illustrated in FIG. 5, the intake valve 73 and the exhaust valve 76 extend vertically so as to extend along the cylinder axis 13a.

When viewed in the axial direction of the camshaft 68, the intake valves 73 are disposed on a first side (a posterior side in the vehicle) relative to the cylinder axis 13a. The intake valves 73 are provided in pairs in juxtaposition with each other along an axial direction of the camshaft 68.

When viewed in the axial direction of the camshaft 68, the exhaust valves 76 are disposed on a second side (an anterior side in the vehicle) relative to the cylinder axis 13a. The exhaust valves 76 are provided in pairs in juxtaposition with each other along the axial direction of the camshaft 68.

When viewed in the axial direction of the camshaft 68, the intake valves 73 are inclined posteriorly relative to the cylinder axis 13a.

When viewed in the axial direction of the camshaft 68, the exhaust valves 76 are inclined anteriorly relative to the cylinder axis 13a.

Specifically, when viewed in the axial direction of the camshaft 68, a distance between the intake valve 73 and the exhaust valve 76 increases at greater distances from the base portion 14a toward the cylinder head cover 15 side.

The rocker arm support shaft 71 is disposed, when viewed in the axial direction of the camshaft 68, superior to the intake valve 73 and the exhaust valve 76 between the intake valve 73 and the exhaust valve 76. The rocker arm support shaft 71 is located on the cylinder axis 13a when viewed in the axial direction of the camshaft 68.

The rocker arm support shaft 71 is a shaft extending in the vehicle width direction in parallel with the camshaft 68 and is supported by the cylinder head 14.

The rocker arm support shaft 71 has a hollow portion extending in the axial direction. The hollow portion serves as an in-shaft oil passage 71a, through which oil passes.

The intake rocker arms 69 have arm shapes extending from the rocker arm support shaft 71 to the respective intake valve units 66. The intake rocker arms 69 are provided in pairs in juxtaposition with each other in the axial direction of the camshaft 68.

The intake rocker arms 69 each include a rotational portion 69a at a proximal end portion thereof. The rotational portion 69a is rotatably supported by the rocker arm support shaft 71. A distal end portion of each of the intake rocker arms 69 includes a depressing portion 69b and a depressed portion 69c. The depressing portion 69b depresses the retainer 74 of the intake valve unit 66. The depressed portion 69c is depressed by the camshaft 68.

The rocker arm support shaft 71 and the intake rocker arms 69 have a discharge hole 71b. The discharge hole 71b provides communication between the in-shaft oil passage 71a and an outside of the intake rocker arms 69. The discharge hole 71b is a hole that passes through the rocker arm support shaft 71 and the rotational portion 69a in the radial direction.

The discharge hole 71b opens superiorly and posteriorly toward the camshaft 68.

The exhaust rocker arm 70 is formed into arms extending from the rocker arm support shaft 71 to the exhaust valve units 67.

The exhaust rocker arm 70 is disposed between the pair of the intake rocker arms 69 and is supported by the rocker arm support shaft 71 as with the intake rocker arms 69. Specifically, the pair of intake rocker arms 69 and the exhaust rocker arm 70 are supported by a single rocker arm support shaft 71. The foregoing configuration promotes reduction in weight and size, compared with a configuration in which a rocker arm support shaft is provided for each of intake and exhaust.

The exhaust rocker arm 70 includes a rotational portion 70a, a pair of left and right arm portions 70b, and a depressed portion 70c. The rotational portion 70a is rotatably supported by the rocker arm support shaft 71. The arm portions 70b extend from the rotational portion 70a toward the respective exhaust valve units 67. The depressed portion 70c extends from the rotational portion 70a superiorly and posteriorly toward the camshaft 68 side.

A depressing portion 70d is disposed at a distal end portion of each of the arm portions 70b. The depressing portion 70d depresses the retainer 77 of each of the exhaust valve units 67. The depressed portion 70c is a rotatable roller and disposed superior to the intake rocker arms 69.

Though not illustrated in FIG. 5, the rocker arm support shaft 71 and the exhaust rocker arm 70 have a discharge hole that provides communication between the in-shaft oil passage 71a and an outside of the exhaust rocker arm 70. As with the discharge hole 71b in the intake rocker arms 69, the discharge hole opens toward the camshaft 68.

The rotational portion 70a of the exhaust rocker arm 70 is disposed between the intake rocker arms 69.

The arm portions 70b extend anteriorly with a spacing therebetween increasing from the rotational portion 70a toward the side of the exhaust valve units 67. A space 70e is formed between the arm portions 70b.

A recess 70f, which is recessed toward the side of the depressed portion 70c, is formed at a portion of the rotational portion 70a facing the space 70e.

The camshaft 68 extends in the vehicle width direction in parallel with the crankshaft 11 and is supported rotatably by the cylinder head 14.

The camshaft 68 is disposed, when viewed in the axial direction of the camshaft 68, on the side of the intake valve units 66 relative to the cylinder axis 13a. The camshaft 68 is disposed superior to the intake valve units 66 and the intake rocker arms 69 and posterior to the depressed portion 70c of the exhaust rocker arm 70.

The camshaft 68 includes a pair of intake cams 68a and an exhaust cam 68b. The intake cams 68a depress the respective depressed portions 69c of the intake rocker arms 69. The exhaust cam 68b depresses the depressed portion 70c of the exhaust rocker arm 70. The exhaust cam 68b is disposed between the two intake cams 68a.

The pair of intake valves 73 and the pair of exhaust valves 76 are driven by the single camshaft 68. This configuration promotes reduction in weight and size, compared with a configuration in which a camshaft is provided for each of intake and exhaust.

The camshaft 68 is rotated via a cam chain 79, which connects the crankshaft 11 and the camshaft 68.

When the intake cams 68a depress the depressed portions 69c through rotation of the camshaft 68, the intake rocker arms 69 rotate about the rocker arm support shaft 71, to thereby cause the depressing portions 69b to depress valve stems of the intake valves 73 in an axial direction of the intake valves 73. As a result, the intake valves 73 resist urging forces of the valve springs 75, so that the intake opening portions 61a are opened.

A rotating direction R1 of the intake cams 68a is a counterclockwise direction in FIG. 5. A rotating direction R2 of the intake rocker arms 69, in which the intake rocker arms 69 are rotated about the rocker arm support shaft 71 by being depressed by the intake cams 68a, is opposite to the rotating direction R1. Compared with a configuration in which the rotating direction R1 and the rotating direction R2 are identical to each other, contact between the intake cams 68a and the depressed portions 69c can be weakened. Thus, an area of a contact surface between the intake cam 68a and the depressed portion 69c can be reduced, so that the valve-actuating mechanism 65 can be reduced in weight.

When the exhaust cam 68b depresses the depressed portion 70c through the rotation of the camshaft 68, the exhaust rocker arm 70 rotates about the rocker arm support shaft 71, to thereby cause the depressing portions 70d to depress valve stems of the exhaust valves 76 in an axial direction of the exhaust valves 76. As a result, the exhaust valves 76 resist urging forces of the valve springs 78, so that the exhaust opening portions 61b are opened.

In the internal combustion engine 10, the rocker arm support shaft 71, which is disposed between the intake valves 73 and the exhaust valves 76, supports the intake rocker arms 69 and the exhaust rocker arm 70 and the intake rocker arms 69 and the exhaust rocker arm 70 are disposed between the intake valves 73 and the exhaust valves 76. This configuration allows a space to be readily obtained between the intake valves 73 and the intake port 18, compared with a configuration in which, for example, the intake rocker arms 69 are disposed between the intake valves 73 and the intake port 18. Thus, the intake port 18 can be disposed vertically so as to extend in the axial direction of the intake valves 73. This contributes to improved intake efficiency.

The cylinder head 14 includes a tubular plug support tube 80, in which an ignition plug (not illustrated) for igniting the combustion chamber is inserted.

The plug support tube 80 is disposed in the space 70e between the pair of arm portions 70b of the exhaust rocker arm 70. The exhaust rocker arm 70, because of the recess 70f thereof facing the space 70e, enables the plug support tube 80 to be disposed close to the exhaust rocker arm 70 through the use of a space in the recess 70f.

Figure 6:
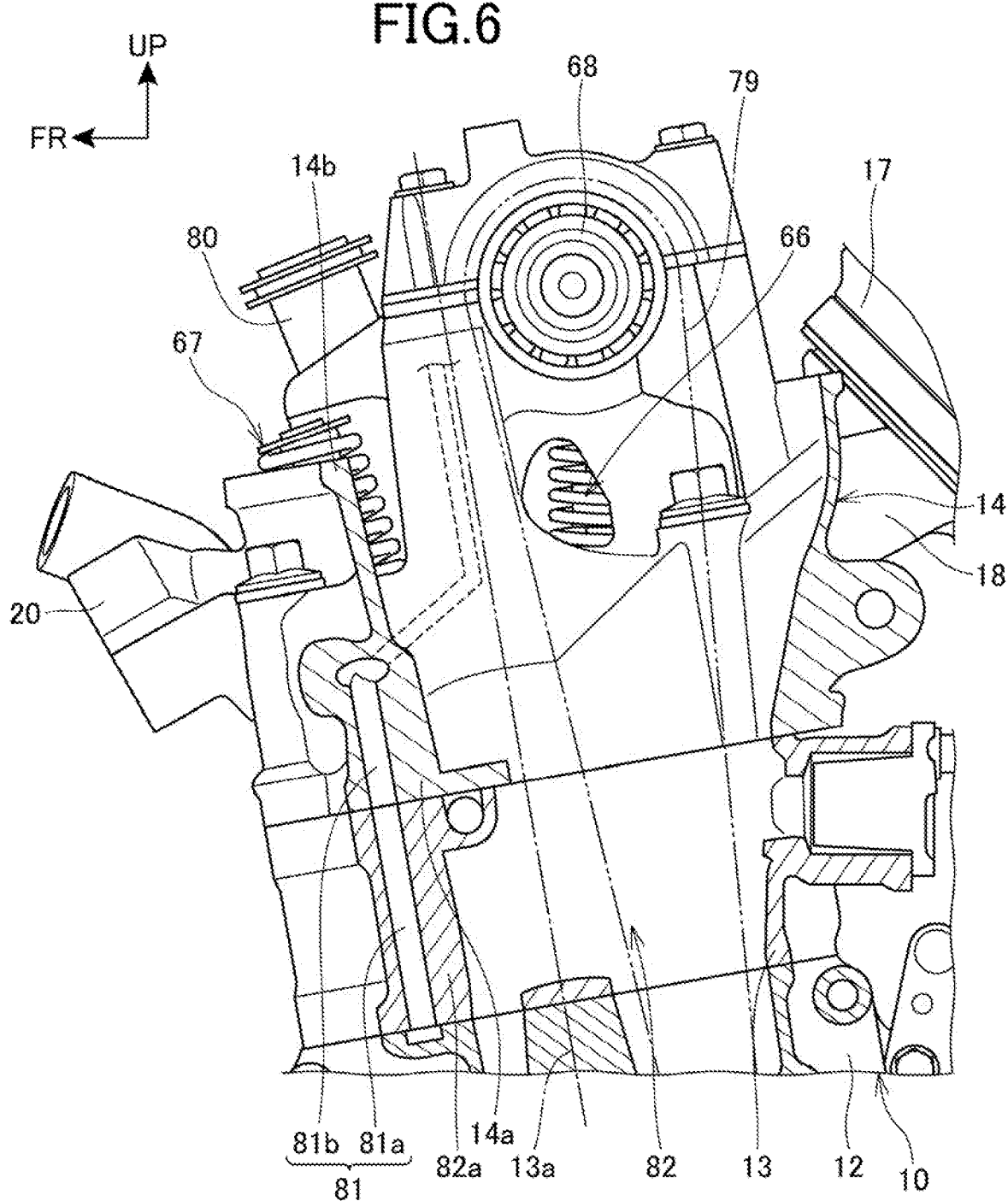
FIG. 6 is a cross-sectional view taken along VI-VI in FIG. 4.

FIG. 6 is a cross-sectional view taken along VI-VI in FIG. 4.

The internal combustion engine 10 has an oil passage 81, through which oil is supplied to the valve-actuating mechanism 65. The oil passage 81 includes a cylinder oil passage 81a and a cylinder head oil passage 81b. The cylinder oil passage 81a passes through the cylinder 13 in the axial direction of the cylinder 13. The cylinder head oil passage 81b extends from a lower end surface of the cylinder head 14 through the cylinder head 14 and is connected with the in-shaft oil passage 71a of the rocker arm support shaft 71.

The cylinder oil passage 81a and the cylinder head oil passage 81b are disposed, when viewed in the axial direction of the camshaft 68, on the side of the exhaust valves 76 relative to the cylinder axis 13a.

More specifically, the cylinder oil passage 81a and a lower portion of the cylinder head oil passage 81b are formed in an anterior wall portion 82a of a cam chain chamber 82, in which the cam chain 79 extends.

Oil stored in the crankcase 12 is sent under pressure by an oil pump (not illustrated) driven by the crankshaft 11, passing through the oil passage 81 to flow into the in-shaft oil passage 71a. The oil in the in-shaft oil passage 71a is injected from the discharge hole 71b in the intake rocker arms 69 and the discharge hole in the exhaust rocker arm 70 toward the camshaft 68, directly lubricating the intake cams 68a and the exhaust cam 68b.

Because the oil passage 81 is disposed on the side of the exhaust valves 76 relative to the cylinder axis 13a in the internal combustion engine 10, the oil passage 81 can be made shorter in length and lubrication can be performed with high efficiency.

As described above, in accordance with the embodiment to which the present invention is applied, the internal combustion engine 10 includes the crankshaft 11, which is supported by the crankcase 12 via the bearings 35, the balancer drive gear 36, which is disposed on the crankshaft 11, the balancer shaft 30, on which the balancer is disposed, the balancer driven gear 43, which is disposed on the balancer shaft 30 and which meshes with the balancer drive gear 36, and the one-way clutch mechanism 37, which transmits to the crankshaft 11 a drive force to start the internal combustion engine 10. In the internal combustion engine 10, the balancer drive gear 36 is disposed between the bearing 35 and the one-way clutch mechanism 37 on the crankshaft 11. The bearing 35 includes the oil seal 35d built therein. The oil seal 35d seals the crank chamber 33 of the crankcase 12. The one-way clutch mechanism 37 includes the case 55, which is fixed to the crankshaft 11, and the starter driven gear 56, which is provided relatively rotatably with respect to the case 55 and which is driven by the drive force. The starter driven gear 56 includes the thrust bearing portion 55e, which abuts on the balancer drive gear 36 in the axial direction of the crankshaft 11.

Through the foregoing configuration, because the bearing 35 includes the built-in oil seal 35d, which seals the crank chamber 33 of the crankcase 12, a need can be eliminated for acquiring a space dedicated to the oil seal 35d outside the bearing 35. Additionally, because the thrust force F of the starter driven gear 56 of the one-way clutch mechanism 37 is borne by the balancer drive gear 36 via the thrust bearing portion 55e, the thrust force F can be effectively borne without the need to increase the size of the one-way clutch mechanism 37 or to provide a member dedicated to the bearing of the thrust force F. Thus, the internal combustion engine 10 can be built smaller in size in the axial direction of the crankshaft 11 and the thrust force F acting on the one-way clutch mechanism 37 can be effectively borne.

The internal combustion engine 10, being small in size in the axial direction of the crankshaft 11, can promote centralization of mass of the motorcycle in which the internal combustion engine 10 is mounted, which leads to enhance riding performance of the motorcycle.

The thrust bearing portion 55e is a protrusion that protrudes in the axial direction of the crankshaft 11 from the side surface of the starter driven gear 56.

Through this configuration, the thrust bearing portion 55e, because of the protruding shape thereof, can be accurately brought into abutment on the balancer drive gear 36.

Additionally, the output gear 38, which outputs the rotation of the crankshaft 11 to the main shaft 31 as another rotational shaft, is disposed on the outside in the axial direction of the crankshaft 11 relative to the one-way clutch mechanism 37, and the starter driven gear 56 extends in the radial direction along the balancer drive gear 36 at a position offset on the side of the balancer drive gear 36 between the balancer drive gear 36 and the output gear 38.

Through the foregoing configuration, because the starter driven gear 56 extends along the balancer drive gear 36 at a position offset on the side of the balancer drive gear 36, the thrust bearing portion 55e can readily be brought into abutment on the balancer drive gear 36 and the thrust force F can be effectively borne. Additionally, the starter driven gear 56 is disposed at the position offset on the side of the balancer drive gear 36 and closer to the side of the crank chamber 33. Thus, the internal combustion engine 10 can be built smaller in size in the axial direction of the crankshaft 11.

The bearing 35, the balancer drive gear 36, the starter driven gear 56, the case 55, and the output gear 38 are disposed in sequence from the crank chamber 33 side.

This configuration can achieve a compact arrangement, by which the thrust force F of the starter driven gear 56 is borne by the balancer drive gear 36 and the rotation of the crankshaft 11 is output from the output gear 38.

Additionally, the balancer drive gear 36 is clamped between the bearing 35 and the case 55 in the axial direction of the crankshaft 11.

Through the foregoing configuration, the balancer drive gear 36 can be correctly positioned in the axial direction of the crankshaft 11 by a simple structure through the use of the case 55 and the thrust force F of the starter driven gear 56 can be borne through the use of the balancer drive gear 36, which is correctly positioned by the case 55.

The water pump 46, which is connected and rotated integrally with the balancer shaft 30, is disposed coaxially with the balancer shaft 30 and disposed, in the axial direction of the crankshaft 11, at a position outside the starter driven gear 56 and overlapping the case 55.

Through the foregoing configuration, the water pump 46 can be disposed closer to the side of the starter driven gear 56 in the axial direction of the crankshaft 11, so that the internal combustion engine 10 can be built smaller in size in the axial direction of the crankshaft 11.

The water pump 46 includes the shaft portion 46a, which is rotatably supported in the crankcase 12 and connected with the balancer shaft 30, and the pump main body portion 46b, which extends from the shaft portion 46a outwards in the radial direction, and the shaft portion 46a of the water pump 46 overlaps the case 55.

Through the foregoing configuration, the shaft portion 46a of the water pump 46 can be disposed closer to the side of the starter driven gear 56 in the axial direction of the crankshaft 11, so that the internal combustion engine 10 can be built smaller in size in the axial direction of the crankshaft 11.

The crankcase 12 includes the support cylinder portion 47a, which supports the shaft portion 46a. The part 47a1 of the support cylinder portion 47a is disposed at a position outside the starter driven gear 56 and overlapping the case 55 in the axial direction of the crankshaft 11 and is located inside the outer peripheral portion 56c of the starter driven gear 56 in the radial direction of the starter driven gear 56.

Through the foregoing configuration, the support cylinder portion 47a of the crankcase 12 can be disposed closer to the side of the starter driven gear 56 in the axial direction and closer to the side of the crankshaft 11 in the radial direction, so that the internal combustion engine 10 can be built smaller in size.

It should be understood that the above-described embodiment represents an illustrative mode to which the present invention is applied and is not limiting.

Although the above-described embodiment exemplifies a configuration in which the internal combustion engine 10 is mounted in the motorcycle, the present invention is not limited thereto and can be applied to an internal combustion engine of a three-wheeled saddle riding vehicle including two front wheels or two rear wheels or of a saddle riding vehicle including four or more wheels.

DESCRIPTION OF REFERENCE SYMBOLS

11 Crankshaft
12 Crankcase
30 Balancer shaft
31 Main shaft (another rotational shaft)
33 Crank chamber
35 Bearing
35d Oil seal
36 Balancer drive gear
37 One-way clutch mechanism
38 Output gear
43 Balancer driven gear
46 Water pump
46a Shaft portion
46b Pump main body portion
47a Support cylinder portion
47a1 Part
55 Case
55e Thrust bearing portion
56 Starter driven gear
56c Outer peripheral portion

The invention claimed is:

1. An internal combustion engine comprising:
a crankshaft supported by a crankcase via a bearing;
a balancer drive gear disposed on the crankshaft;
a balancer shaft on which a balancer is disposed;
a balancer driven gear disposed on the balancer shaft, the balancer driven gear meshing with the balancer drive gear; and
a one-way clutch mechanism that transmits to the crankshaft a drive force to start the internal combustion engine, the balancer drive gear being disposed between the bearing and the one-way clutch mechanism on the crankshaft, wherein
the balancer drive clear is disposed adjacent to the bearing on an outside of a crank chamber of the crankcase,
the one-way clutch mechanism includes a case fixed to the crankshaft and a starter driven gear provided relatively rotatably with respect to the case and driven by the drive force,
the bearing, the balancer drive gear, the starter driven gear, and the case are disposed on the crankshaft in sequence from a side of the crank chamber, side-by-side in an axial direction of the crankshaft, and
the starter driven gear includes a thrust bearing portion that abuts on the balancer drive gear on a surface, of the starter driven gear, facing the balancer drive gear, and the thrust bearing portion is a protrusion that protrudes in the axial direction of the crankshaft toward the balancer drive gear.

2. The internal combustion engine according to claim 1, further comprising:
an output gear disposed on an outside in the axial direction of the crankshaft relative to the one-way clutch mechanism, the output gear outputting rotation of the crankshaft to another rotational shaft, wherein
the starter driven gear extends in a radial direction along the balancer drive gear at a position offset on a side of the balancer drive gear between the balancer drive gear and the output gear.

3. The internal combustion engine according to claim 2, wherein the bearing, the balancer drive gear, the starter driven gear, the case, and the output gear are disposed in sequence from the side of the crank chamber.

4. The internal combustion engine according to claim 1, wherein the balancer drive gear is clamped between the bearing and the case in the axial direction of the crankshaft.

5. The internal combustion engine according to claim 1, further comprising:
a water pump connected, rotated integrally with, and disposed coaxially with the balancer shaft, wherein
the water pump is disposed, in the axial direction of the crankshaft, at a position outside the starter driven gear and overlapping the case.

6. The internal combustion engine according to claim 5, wherein
the water pump includes a shaft portion that is rotatably supported in the crankcase and connected with the balancer shaft and a pump main body portion that extends from the shaft portion outwards in a radial direction, and
the shaft portion of the water pump overlaps the case.

7. The internal combustion engine according to claim 6, wherein
the crankcase includes a support cylinder portion that supports the shaft portion, and
the support cylinder portion has a part disposed at a position outside the starter driven gear and overlapping the case in the axial direction of the crankshaft and located inside an outer peripheral portion of the starter driven gear in a radial direction of the starter driven gear.

8. The internal combustion engine according to claim 1, wherein the bearing includes an oil seal built therein, the oil seal sealing the crank chamber of the crankcase.

* * * * *